US007692529B2

(12) United States Patent
Hagl et al.

(10) Patent No.: US 7,692,529 B2
(45) Date of Patent: Apr. 6, 2010

(54) PASSIVE ENTRY AND IMMOBILIZER AT DIFFERENT FREQUENCIES USING SAME ANTENNA COIL

(75) Inventors: Andreas Hagl, Dachau (DE); Konstantin Aslanidis, Dachau (DE)

(73) Assignee: Texas Instruments Deutschland GmbH, Freising (DE)

( * ) Notice: Subject to any disclaimer, the term of this patent is extended or adjusted under 35 U.S.C. 154(b) by 960 days.

(21) Appl. No.: 11/278,736

(22) Filed: Apr. 5, 2006

(65) Prior Publication Data

US 2006/0220786 A1   Oct. 5, 2006

(30) Foreign Application Priority Data

Apr. 5, 2005   (DE) ................... 10 2005 015 594

(51) Int. Cl.
*H04B 1/38* (2006.01)
(52) U.S. Cl. ............... 340/5.61; 340/5.72; 340/10.34; 340/426.35; 340/426.36
(58) Field of Classification Search ............ 340/5.61, 340/10.1, 10.2, 572.1, 5.2, 426.36; 307/10.3, 307/10.5; 336/83, 96; 343/788, 895
See application file for complete search history.

(56) References Cited

U.S. PATENT DOCUMENTS

| 5,745,026 | A  | * | 4/1998  | Kokubu et al. ........ 340/286.01 |
| 6,329,909 | B1 |   | 12/2001 | Siedentop |
| 6,480,095 | B1 | * | 11/2002 | Flick ....................... 340/5.2 |
| 6,731,198 | B1 | * | 5/2004  | Stobbe et al. ........... 340/10.33 |
| 6,734,797 | B2 | * | 5/2004  | Shanks et al. ........... 340/572.4 |
| 6,784,813 | B2 | * | 8/2004  | Shanks et al. ............. 341/53 |
| 6,956,509 | B2 | * | 10/2005 | Shanks et al. ............. 341/53 |
| 6,965,295 | B2 | * | 11/2005 | Shimonomoto et al. .... 340/5.61 |
| 6,989,750 | B2 | * | 1/2006  | Shanks et al. ........... 340/572.4 |
| 2002/0149469 | A1 | * | 10/2002 | Thompson, Jr. ........... 340/5.61 |
| 2005/0237163 | A1 | * | 10/2005 | Lee et al. ................. 340/10.51 |

FOREIGN PATENT DOCUMENTS

DE        19539939        4/1997

* cited by examiner

*Primary Examiner*—George A Bugg
(74) *Attorney, Agent, or Firm*—William B. Kempler; Wade J. Brady, III; Frederick J. Telecky, Jr

(57) ABSTRACT

A passive entry and immobilizer key for vehicles comprises an integrated front-end circuit (12b) with three battery-supplied receiver channels (14, 16, 18), each connected to an associated external antenna circuit with an inductor-capacitor combination (LR, CR) having a resonant frequency in the very low frequency range. The three antennas are arranged in a three-dimensional configuration. An immobilizer transponder (22) is supplied by energy received from an external transponder antenna circuit and stored in a storage capacitor (CL). The transponder antenna circuit includes an inductor-capacitor combination (LR, CR, CL) having a resonant frequency in the low frequency range. The transponder antenna circuit shares at least one inductive component (LR) with the antenna circuit of one of the three receiver channels. A capacitor in the transponder antenna circuit is selectively disconnected to change the resonant frequency from a frequency in the very low frequency range to a frequency in the low frequency range. Accordingly, one of the three antenna circuits has a dual function. A first function is that in a three-dimensional analog front end of a passive entry system that operates in the very low frequency range. A second function is that in a transponder of an immobilizer system that operates in the much higher low frequency range. As a result, only three antenna coils need to be implemented in the key.

15 Claims, 2 Drawing Sheets

| VBAT_OK | IMMO | $\overline{\text{IMMO}}$ | F_SEL | SWITCH SW | FREQUENCY |
|---|---|---|---|---|---|
| 0 | X | 0 | 0 | OPEN | 125kHz |
| 1 | 0 | 1 | 1 | CLOSED | 20kHz |
| 1 | 1 | 0 | 0 | OPEN | 125kHz |

PASSIVE ENTRY AND IMMOBILIZER AT DIFFERENT FREQUENCIES USING SAME ANTENNA COIL

The invention relates to a passive entry and immobilizer key for vehicles, and to a method of operating a passive entry and immobilizer key for vehicles.

BACKGROUND

Advanced portable identification devices such as passive entry and immobilizer keys for vehicles have an analog three-dimensional front end, which is an integrated circuit, including three independent receiver channels each intended to be connected to one out of three external antenna circuits included in the device. The three antenna circuits have antenna structures that are physically oriented at mutually 90°. With such a device, signals from a transceiver in a vehicle are detected independent of orientation in space of the device. Typically, these devices operate at a frequency in a low frequency (LF) range around 125 kHz or 135 kHz. For an extended range, they are battery-powered.

Regarding passive entry systems, noise issues have led to proposals for much lower operating frequencies just at the limit of human perception, i.e. around 20 kHz. Changing an analog three-dimensional front end to such a very low frequency is possible, but existing immobilizer concepts still work in the low frequency (LF) range (around 125 kHz or 135 kHz). With a front end operating at a very low frequency (VLF) for the passive entry functionality and at a low frequency (LF) for the immobilizer functionality, a fourth antenna circuit tuned to the low frequency would be required.

SUMMARY

The invention allows combining a passive entry function operating at a very low frequency (VLF) with an immobilizer function operating at a low frequency (LF) using only three antenna circuits.

Specifically, the invention provides a passive entry and immobilizer key for vehicles that comprises an integrated front-end circuit with three battery-supplied receiver channels each connected to an associated external antenna circuit with an inductor-capacitor combination having a resonant frequency in the very low frequency range. The three antennas are arranged in a three-dimensional configuration. An immobilizer transponder is supplied by energy received from an external transponder antenna circuit and stored in a storage capacitor. The transponder antenna circuit includes an inductor-capacitor combination having a resonant frequency in the low frequency range. The transponder antenna circuit shares at least an inductive component with the antenna circuit of one of the three receiver channels. A capacitor in the transponder antenna circuit is selectively disconnected to change the resonant frequency from a frequency in the very low frequency range to a frequency in the low frequency range. Accordingly, one of the three antenna circuits has a dual function. A first function is that in a three-dimensional analog front end of a passive entry system that operates in the very low frequency range. A second function is that in a transponder of an immobilizer system that operates in the much higher low frequency range. As a result, only three antenna coils need to be implemented in the key.

The invention also provides a method of operating the above passive entry and immobilizer key for vehicles. The method comprises the steps of selectively connecting a capacitor into the transponder antenna circuit to change the resonant frequency from a low frequency to a very low frequency, detecting a received frequency in the low frequency range while the selectively switched capacitor is connected into the transponder antenna circuit (and the antenna circuit is thus tuned to the very low frequency), detecting an applied battery voltage, and disconnecting the capacitor from the transponder antenna circuit to change the resonant frequency from the very low frequency to the low frequency when a sufficient battery voltage is not detected or when a received frequency in the low frequency range is detected.

The method enables a normal immobilizer transponder mode when the battery is low, or when a signal in the low frequency range is received from a vehicle's immobilizer transceiver unit. In such a transponder mode, the energy for operating the transponder is obtained by rectifying a received signal, and the energy is stored in a capacitor. By automatically switching the resonant frequency of the antenna circuit to the higher frequency range when required, the available energy in the transponder mode is optimized.

BRIEF DESCRIPTION OF THE DRAWINGS

Further advantages and features of the invention will appear from the following detailed description of a preferred embodiment with reference to the appended drawings. In the drawings.

DETAILED DESCRIPTION

Figure 1:
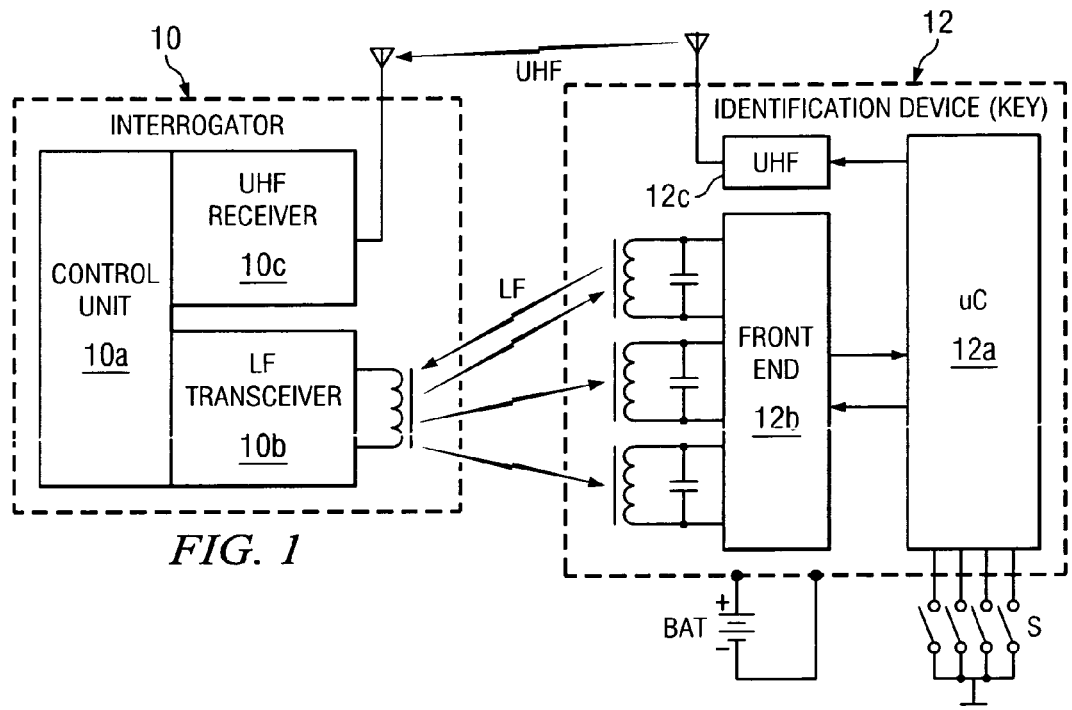
FIG. 1 is a schematic block diagram of a passive entry and immobilizer system using a key as a portable identification device.

The passive entry and immobilizer system in FIG. 1 consists of an interrogator unit 10 installed in a vehicle and a portable identification device, or key 12. The interrogator 10 includes a control unit 10a, a transceiver 10b and an ultra high frequency (UHF) receiver 10c. Key 12 incorporates a microcontroller 12a connected to a number of external command switches S, an analog front end 12b and a UHF transmitter 12c. The front end 12b includes three independent channels, each connected to one out of three antenna circuits which are mutually arranged at 90°, i.e. three-dimensionally. The three antenna circuits of key 12 may be inductively coupled over a short distance with transceiver 10b of interrogator 10 through a single antenna circuit. The interrogator 10 and key 12 both have a UHF antenna and are thus also coupled via UHF. Power for operation of key 12 is supplied by a battery BAT.

For the purpose of passive entry, the inductive coupling between interrogator 10 and key 12 permits an exchange of data by transmitting, from interrogator 10 to key 12, signals in a very low frequency (VLF) range, which is just above the limit of human perception, typically 20 kHz, and by transmitting signals in the UHF range from key 12 to interrogator 10.

Figure 2:
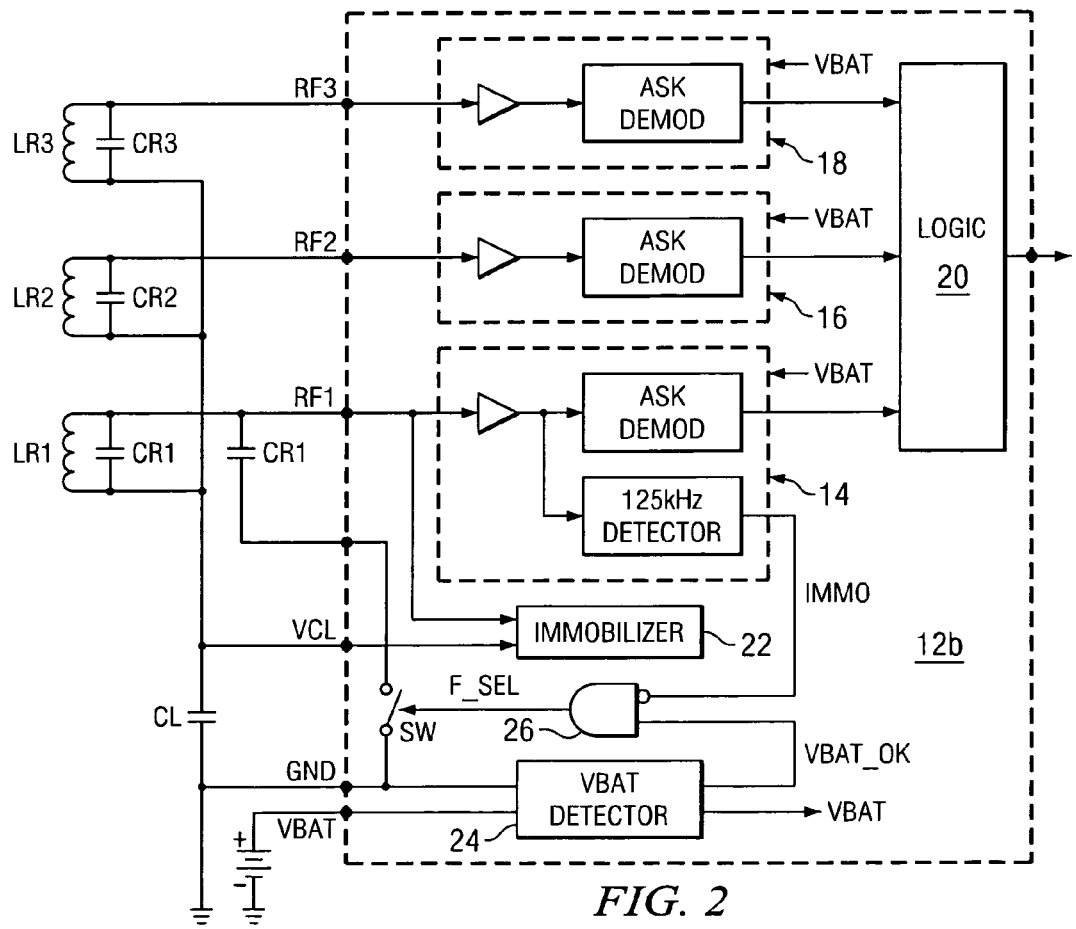
FIG. 2 is a block diagram of a front end in a key for use in the system of FIG. 1.

With reference to FIG. 2, front end 12b includes three receiver channels 14, 16, 18 each including an automatic gain control (AGC) amplifier and an amplitude shift keying (ASK) demodulator. Channel 14 additionally includes a 125 kHz detector. Channels 14, 16 and 18 are supplied from battery BAT and each have an output connected to logic circuitry 20, the output of which is connected to microcontroller 12a (FIG. 1). Channel 14 has an input terminal RF1 to which an antenna circuit comprising antenna coil LR1 and a parallel capacitor CR1 is connected. Channel 16 has an input terminal RF2 to which an antenna circuit comprising antenna coil LR2 and a parallel capacitor CR2 is connected. Channel 18 has an input terminal RF3 to which an antenna circuit comprising antenna coil LR3 and a parallel capacitor CR3 is connected. In the example, antenna coils LR1, LR2 and LR3 are of like inductivity. Capacitors CR2 and CR3 are dimensioned for a resonant frequency in the VLF range, e.g., 20 kHz. Capacitor CR1 is dimensioned for a resonant frequency in a low frequency (LF) range. As used here, "low frequency" (LF) means a frequency in a range of around 125 kHz or 135 kHz. Another capacitor CR has a first electrode connected to input terminal RF1 and a second terminal which is selectively connected to ground UND through a switch SW. A charge capacitor CL is connected between GND and a terminal VCL to which all three antenna circuits are connected at an end opposite to that connected to a corresponding input of front end 12b. Front end 12b is an integrated CMOS circuit that has an internal diode, the substrate diode, which acts as a rectifier for an LF signal at terminal VCL. Since charge capacitor CL has a much bigger capacity than capacitor CR, the latter is effectively connected in parallel with capacitor CR1 when switch SW is closed. With both capacitors CR1 and CR in parallel to LR1, the resonant frequency is in the VLF range and has the same value as for the two other antenna circuits.

Accordingly, while channels 16 and 18 operate at a VLF frequency, channel 14 operates at the same frequency when switch SW is closed and at a LF frequency when switch SW is open. For the immobilizer functionality, the front end 12b includes an immobilizer transponder 22 that has an input connected to terminal RH and a supply input connected to terminal VCL. Signals transmitted from transceiver 10b in the LF range are received through channel 14 not only for the purpose of immobilizer functionality, but also for the purpose of energy supply, by charging capacitor CL, permitting a battery-less operation of the immobilizer transponder 22 in the LF range.

The front end 12b further includes a battery voltage detector 24 with an input connected to terminal VBAT where battery BAT is connected and an output providing an indication signal VBAT_OK when a voltage level sufficient for battery supply is detected.

The 125 kHz detector in channel 14 has an input connected to the node between the AGC amplifier and the ASK demodulator, and an output that provides an indication signal Immo when a 125 kHz signal is detected.

Switch SW is controlled by the output F_SEL of an AND gate 26 which has an inverting input connected to the output Immo of the 125 kHz detector in channel 14 and a non-inverting input connected to the output VBAT_OK of battery voltage detector 26. The resulting resonant frequencies of the antenna circuit to which channel 14 is connected are summarized in the table of FIG. 3 and illustrated in the state diagram of FIG. 4.

Figures 3, 4:
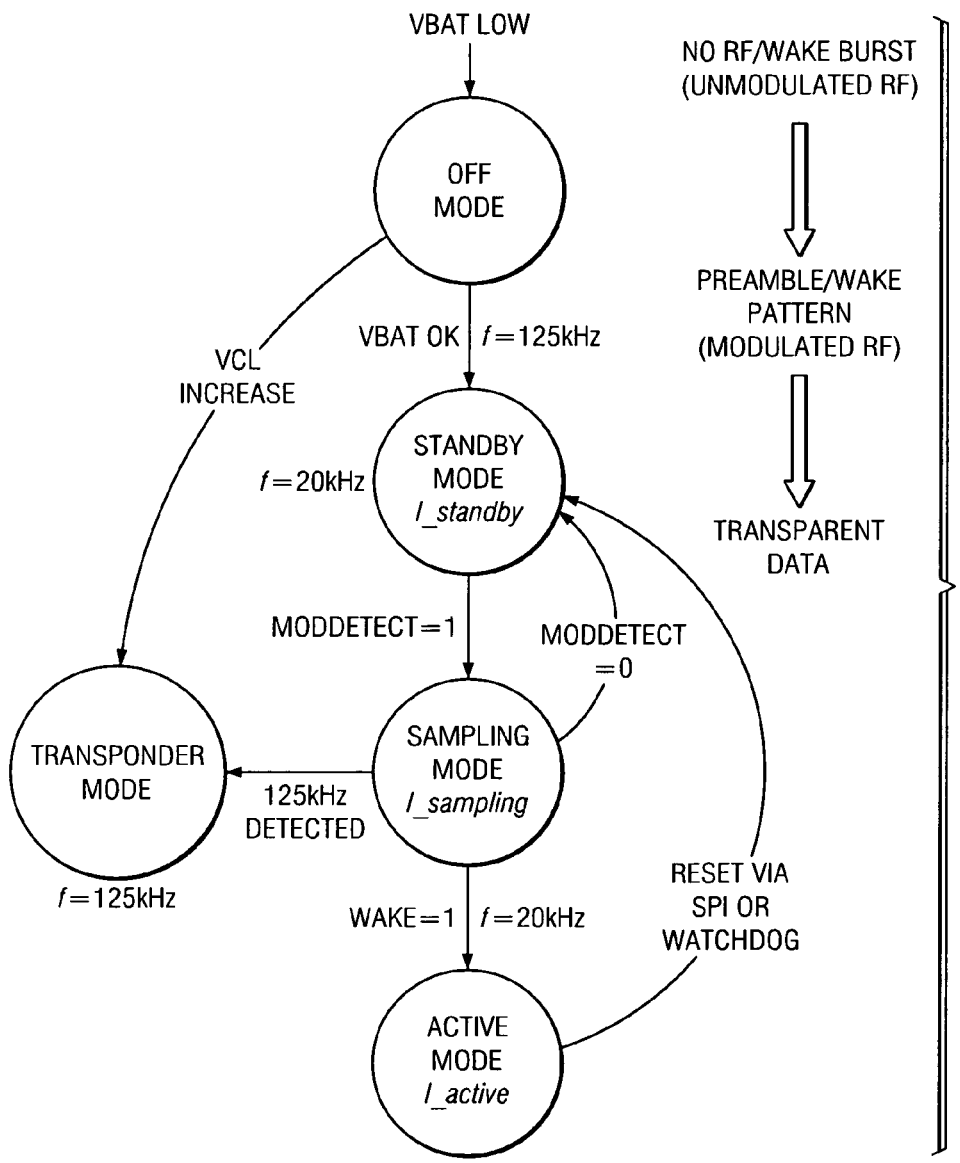
FIG. 3 is a table that summarizes logical decisions determining the resonant frequency of one of the three antenna circuits in FIG. 2.
FIG. 4 illustrates different operating modes of the passive entry and immobilizer system.

As is seen from FIGS. 3 and 4, the resonant frequency is 125 kHz whenever the battery voltage is low. In this condition, immobilizer functionality is ensured by immobilizer transponder 22 supplied from the charge in capacitor CL. With a sufficient battery voltage and no detected 125 kHz signal, the frequency is 20 kHz, and channel 14 operates like channels 16 and 18 in a three-dimensional (3D) 10 configuration for passive entry functionality. When a 125 kHz signal is detected, independent of the battery level, the frequency is 125 kHz, giving the immobilizer function a priority over the passive entry function.

The latter condition is illustrated in FIG. 4 as a "Transponder Mode", which can be entered either from an "Off Mode" by detection of an increase of the voltage at terminal VCL, or from a "Sampling mode" by detection of a 125 kHz signal. The Off Mode is only entered when a low battery voltage is detected. When a sufficient battery voltage is detected, the system enters a "Standby Mode". From the Standby Mode the system enters the Sampling Mode in response to a signal MODDETECT=1, and the system returns to the Standby Mode in response to a signal MODDETECT=0. From the Sampling Mode the system enters an Active Mode in response to a wake signal WAKE=1 and the Active Mode is left after a Reset or a Watchdog signal for entry into the Standby Mode.

While the embodiment disclosed has only one channel (channel 14) with a LF detector and an antenna circuit that is switched between the low frequency (LF) and the very low frequency (VLF), other embodiments could have two or even all three channels with similar capabilities.

Those skilled in the art to which the invention relates will appreciate that various additions, deletions, substitutions and other modifications may be made to the described embodiments, without departing from the scope of the claimed invention.

The invention claimed is:

1. A passive entry and immobilizer key for vehicles, comprising:
   an integrated front-end circuit with three battery-supplied receiver channels each connected to an associated external antenna circuit including an inductor-capacitor combination having a resonant frequency in the very low frequency range, the antennas of the associated external antenna circuits being arranged in a three-dimensional configuration; and
   at least one immobilizer transponder supplied by energy received from an external transponder antenna circuit and stored in a storage capacitor, the transponder antenna circuit including an inductor-capacitor combination having a resonant frequency in the low frequency range, wherein the external transponder antenna circuit shares at least an inductive component with one of the associated external antenna circuits of one of the three receiver channels, a capacitor in the transponder antenna circuit being selectively disconnected to change the resonant frequency from a frequency in the very low frequency range to a frequency in the low frequency range.

2. The passive entry and immobilizer key according to claim 1, wherein said selectively disconnected capacitor is switched in parallel with a permanently connected capacitor of the transponder antenna circuit.

3. The passive entry and immobilizer key according to claim 1, wherein said one receiver channel includes a frequency detector that detects a received frequency in the low frequency range even though the selectively disconnected capacitor is connected into the transponder antenna circuit, the frequency detector providing a detection signal when a low frequency signal is detected.

4. The passive entry and immobilizer key according to claim 1, and including a battery voltage detector that detects an applied battery voltage and provides a detection signal when a sufficient battery voltage level is detected.

5. The passive entry and immobilizer key according to claim 3, wherein the detection signals of said frequency detector and said battery voltage detector are combined by logic circuitry to provide a control signal for a switch that disconnects the selectively disconnected capacitor in the transponder antenna circuit.

6. The passive entry and immobilizer key according to claim 1, and comprising a plurality of transponder circuits each of which has an antenna circuit that shares an inductive component with an antenna circuit of a different one of the three receiver channels.

7. A method of operating a passive entry and immobilizer key for vehicles, the key comprising an integrated front-end circuit with three battery-supplied receiver channels each connected to an associated external antenna circuit including an inductor-capacitor combination having a resonant frequency in the very low frequency range, the antennas of the associated external antenna circuits being arranged in a three-dimensional configuration, and the key further comprising an immobilizer transponder supplied by energy received from an external transponder antenna circuit and stored in a storage capacitor, the external transponder antenna circuit including an inductor-capacitor combination having a resonant frequency in the a low frequency range; wherein the transponder antenna circuit shares at least an inductive component with the antenna circuit of one of the three receiver channels, comprising the steps of:
  selectively connecting a capacitor into the transponder antenna circuit to change the resonant frequency from a low frequency to a very low frequency;
  detecting a received frequency in the low frequency range while the selectively switched capacitor is connected into the transponder antenna circuit;
  detecting an applied battery voltage; and
  disconnecting the capacitor from the transponder antenna circuit to change the resonant frequency from the very low frequency to the low frequency when a sufficient battery voltage is not detected or when a received frequency in the low frequency range is detected.

8. The passive entry and immobilizer key according to claim 2, wherein said one receiver channel includes a frequency detector that detects a received frequency in the low frequency range even though the selectively disconnected capacitor is connected into the transponder antenna circuit, the frequency detector providing a detection signal when a low frequency signal is detected.

9. The passive entry and immobilizer key according to claim 2, and including a battery voltage detector that detects an applied battery voltage and provides a detection signal when a sufficient battery voltage level is detected.

10. The passive entry and immobilizer key according to claim 3, and including a battery voltage detector that detects an applied battery voltage and provides a detection signal when a sufficient battery voltage level is detected.

11. The passive entry and immobilizer key according to 4, wherein the detection signals of said frequency detector and said battery voltage detector are combined by logic circuitry to provide a control signal for a switch that disconnects the selectively disconnected capacitor in the transponder antenna circuit.

12. The passive entry and immobilizer key according to claim 2, and comprising a plurality of transponder circuits each of which has an antenna circuit that shares an inductive component with an antenna circuit of a different one of the three receiver channels.

13. The passive entry and immobilizer key according to claim 3, and comprising a plurality of transponder circuits each of which has an antenna circuit that shares an inductive component with an antenna circuit of a different one of the three receiver channels.

14. The passive entry and immobilizer key according to claim 4, and comprising a plurality of transponder circuits each of which has an antenna circuit that shares an inductive component with an antenna circuit of a different one of the three receiver channels.

15. The passive entry and immobilizer key according to claim 5, and comprising a plurality of transponder circuits each of which has an antenna circuit that shares an inductive component with an antenna circuit of a different one of the three receiver channels.

* * * * *